G. M. LUDLOW.
MULTIPLE PAYMENT CHECK.
APPLICATION FILED SEPT. 30, 1914.

1,198,936.

Patented Sept. 19, 1916.

Witnesses:
C. C. Burnap
Henry A. Parks

Inventor:
By George M. Ludlow
Sheridan, Wilkinson & Scott, Att'ys

UNITED STATES PATENT OFFICE.

GEORGE M. LUDLOW, OF CHICAGO, ILLINOIS.

MULTIPLE-PAYMENT CHECK.

1,198,936.

Specification of Letters Patent.

Patented Sept. 19, 1916.

Application filed September 30, 1914. Serial No. 864,289.

*To all whom it may concern:*

Be it known that I, GEORGE M. LUDLOW, a citizen of the United States, residing at Chicago, in the county of Cook and State of Illinois, have invented certain new and useful Improvements in Multiple-Payment Checks, of which the following is a specification.

My invention relates in general to bank checks and more particularly to a check so constructed that a single check may be used by one having an account in a bank to pay a plurality of debts.

According to the method now in general use in banking institutions, it is necessary that one having an account in a bank must draw a separate check upon the bank in payment of each separate debtor of the drawer of the check. This practice imposes a great deal of labor upon one who has a number of monthly accounts to pay, as a separate check must be drawn, a separate envelop addressed, and a separate stamp, of course, used, in order to settle each account by a check drawn on the debtor who has funds deposited.

It is obvious that any bank which would put into use a check so constructed that the depositors of the bank could pay a number of accounts by drawing a single check upon the bank would greatly increase the volume of its business, as the number of its depositors would be largely increased by persons anxious to avail themselves of the use of such labor-saving checks.

The primary object of my invention is to provide a check so constructed that a single one may be used by a depositor of a bank employing such form of check to pay a plurality of debts, thereby obviating the necessity of a separate check being made for each of the parties to whom a bank depositor desires to make a payment.

A further object of my invention is to provide a form of multiple payment check, the use of which will so subserve the convenience of bank depositors that the business of a bank employing such form of check will be increased by the addition to its depositors of those desiring to avail themselves of the benefits derived from the use of such a check.

The drawing represents one of my improved multiple checks. The part A at the left of the form illustrated is a stub or permanent record and is preferably separated by a perforated or weakened line 1 from the remainder of the form. A plurality of forms such as illustrated, may be bound together in book form as usual with checks of the ordinary kind in which case the stubs or permanent records will be retained in the covers after the detachable part of the form has been detached and used.

The detachable part of the check form at the right of the perforated or weakened line 1 consists of two parts, B and C which two parts may also, if desired, be separated by a perforated or weakened line located as indicated by the numeral 2.

The part B of the form consists of an order upon the bank in which the depositor has an account, to pay to itself from the depositor's account a designated amount for which blank spaces are provided, as usual, on ordinary check forms and this part of the form also contains directions that the amount which the bank is to pay to itself from the depositor's account is to be credited to the several parties designated upon the part C of the form in the amounts there designated, it being understood, of course, that the amount which the bank is directed to credit itself from the depositor's account is the total of the several items designated upon the part C of the form.

Upon the part C of the form there is preferably printed the names of the merchants or others with whom the depositor ordinarily has business accounts, with appropriate ruling and blank spaces opposite the respective names for the insertion of such amounts as the depositor desires to pay to said parties. As indicated in the illustration, the part C of the check is also provided with a ruled portion left blank for the insertion of names of other parties than those whose names are printed to whom the depositor may desire to make payments, these blank spaces being also provided with dollar and cent columns similar to those appearing opposite the printed names for the insertion of the desired amounts.

The part A of the check form to the left of the perforated or weakened line 1, is provided at its upper portion with blank spaces for the number of the multiple payment check, for the date, and with a series of blank spaces for the insertion of the names of the parties to whom credits or payments are designated upon the part C of the check, and also with dollar and cent columns for the insertion of the amounts so designated to be paid or credited.

As above indicated, my improved multiple check form is designed to be used in a transaction wherein a bank depositor instead of making separate checks to each of the parties to whom he desires to make payment, merely directs the bank to credit these several parties with the desired amounts and to deduct the total of said amounts from the depositor's account. Assuming, for illustration, that the depositor desires in settling his monthly accounts, to pay A. Anderson $10.00, Banks and Smith $15.00 and the Gault Market $30.00, he would enter these respective amounts opposite the names of those parties as printed upon the part C of the multiple payment check, and in case the depositor owed J. Fisher $20.00, the latter name not appearing in the printed list, he would write that name in one of the blank spaces therefor provided with $20.00 opposite the same. Having thus made his entries in the part C of the multiple payment check, he would total the payments directed and would insert the total, $75.00 in the spaces therefor provided in the part B of the multiple payment check and would date, number and sign the same. Thereupon, for his permanent record, he would enter the number and date of the multiple payment check upon the stub A of the form and in the space therefor provided at the lower part of the stub A would enter the names of A. Anderson, Banks and Smith, Gault Market, and J. Fisher with the respective amounts opposite these names as appearing upon the part C of the multiple payment check. The depositor would thereupon send the multiple payment check to his bank, thus enabling the bank to carry out the desired transaction of paying the several parties the amounts designated without putting the depositor to the trouble of writing separate checks for each of said parties and sending them to such parties.

Upon receipt of such a multiple check, the bank would proceed as in all cases where it is authorized to transfer funds from the account of one depositor to that of another, or to make payment on behalf of one of its depositors to a party not a depositor. In the case of a payee of the multiple check being a depositor in the same bank the transaction would simply be one of bookkeeping wherein the bank would transfer the amount designated from the account of the payer to that of the payee, informing the payee that his account had been so credited by payment made by the payer. In the case of those payees of the multiple payment check who are not depositors in the same bank, the bank would simply hold the amount to the credit of the payees, informing them that it held such amounts to their credit for such disposition as the payees might direct.

The transactions in which my improved multiple payment check is designed to be used are not individually of a novel character, but the use of my improved multiple payment check renders it possible to greatly facilitate such transactions and to carry them on upon a much larger scale than heretofore, thus saving time and labor upon the part of the depositor as well as the bank itself. The saving of time to the depositor results from obviating the necessity of making a large number of separate checks, and a saving of labor is effected on the part of the bank in the fact that the entry of a single debit item in a depositor's account is substituted for the entry of the many items appearing upon a large number of checks. It will be further evident that the adoption by banking institutions of my improved multiple payment check will lead to a large increase in the business of such banking institutions, owing to the desire of those who pay their accounts by checks to avail themselves of the advantages in the saving of time and expenses incident to the payment of a plurality of debts by the drawing and transmission of a single check. It will be also seen that the business of banking institutions employing my improved multiple payment check will be further increased by securing as depositors many of the creditors to whom it is directed to distribute funds by its depositors, as it would obviously be to the advantage of such creditors to have accounts in the banking institutions in which deposits are made to their credit by their customers. Inasmuch, however, as my invention resides in the form of multiple payment check herein illustrated and described, it is not necessary to dwell at length upon the many points in which the transactions between a bank and its depositors are simplified, the foregoing, however, indicating in a general way the convenience which results from the use of any means to facilitate an extension of the transaction of business directly through a bank and without individual checks or other dealings directly between the depositors.

What I claim is:

1. A bank check having thereon a space for the signature of the drawer and comprising a plurality of parts, one part bearing thereon the name of a bank and containing instructions to the bank to charge a total amount to the account of the drawer and to distribute to a plurality of parties specified individual amounts, the sum of which equals said total amount, and another part of said check comprising spaces for the names of said parties to whom amounts are to be distributed, and for the insertion of the individual amounts to be distributed to said parties.

2. A bank check having thereon a space for the signature of the drawer and comprising a plurality of sections, one section bearing thereon the name of a bank and containing instructions to the bank to charge a total amount to the account of the drawer, and to distribute to a plurality of parties specified individual amounts, the sum of which equals said total amount, a second section comprising spaces for the names of said parties to whom distributions are to be made and for the insertion of the individual amounts to be distributed to said parties, a third section to be retained by the drawer comprising spaces for duplicate records of the names of said plurality of parties and of the individual amounts to be distributed to them, and means detachably connecting said first and second sections with said third section.

3. A device for use in disbursing to a plurality of parties moneys deposited with a bank, consisting of a plurality of parts one bearing thereon the name of the bank and instructions to the bank to charge a total amount to the account of the depositor and to distribute to a plurality of parties specified individual amounts the sum of which equals said total amount, and having spaces for the signature of the depositor and for the insertion of the total amount equal to the sum of the amounts to be disbursed, another part comprising spaces for the names of the parties to whom disbursements are to be made and for the insertion of the individual amounts to be disbursed to said parties, and a third part to be retained by the depositor comprising spaces for records of the names of the plurality of parties and of the individual amounts to be disbursed to them.

4. A device for use in disbursing to a plurality of parties moneys deposited with a bank, consisting of separable parts to be respectively transmitted to the bank and to be retained by the depositor, the part to be transmitted to the bank having thereon the name of the bank and instructions to the bank to charge a total amount to the account of the depositor and to distribute to a plurality of parties specified individual amounts the sum of which equals said total amount and comprising spaces for the signature of the depositor, for the insertion of the total amount equal to the sum of the amounts to be disbursed, for the designations of the parties to whom disbursements are to be made, and for the insertion of the individual amounts to be disbursed to said parties, and the part to be retained by the depositor comprising spaces for records of the designations of the plurality of parties and for the individual amounts to be disbursed to them.

5. A device for use in disbursing to a plurality of parties moneys deposited with a bank, consisting of a form comprising spaces for the signature of the depositor, the names of the payees, the individual amounts to be disbursed to said payees, and the total of said individual amounts, and having thereon an order on the said bank to credit the designated individual amounts to the respectively designated payees and to charge the said total amount to the account of said depositor.

In testimony whereof I have subscribed my name.

GEORGE M. LUDLOW.

Witnesses:
GEO. L. WILKINSON,
HENRY A. PARKS.